Patented Mar. 27, 1951

2,546,175

UNITED STATES PATENT OFFICE 2,546,175

INSECTICIDAL COMPOSITION CONTAINING A POLYCHLORO p-MENTHANE

William D. Stonecipher, Newark, Del., assignor to Hercules Powder Company, Wilmington, Del., a corporation of Delaware No Drawing. Original application August 4, 1945, Serial No. 609,019. Divided and this application June 23, 1950, Serial No. 170,025

2 Claims. (Cl. 167—30)

This invention relates to an insecticidal composition and more particularly to an insecticidal composition containing a polychloro monocyclic terpene as the toxic ingredient.

Among the more commonly used insecticidal toxicants are the naturally occurring products, pyrethrum, rotenone and nicotine. These natural products have the very great disadvantage of not being uniform in their insecticidal activity. Many synthetic products have been suggested in the past as substitutes for these toxicants, however, they are usually lacking in one respect or another. They do not have a high enough killing power and must be used in concentrations which cause irritation to the user, or if they are sufficiently toxic, they are also toxic to forms of animal life other than insect pests.

Now in accordance with this invention it has been found that insecticidal compositions containing as a toxic ingredient a polychloro monocyclic terpene, having a chlorine content of from about 50% to about 75%, possess a high degree of insecticidal activity.

The following examples will illustrate the preparation of these polychloro monocyclic terpenes and the insecticidal activity of compositions containing them.

EXAMPLE 1

One part of dipentene dissolved in 5 parts of carbon tetrachloride was placed in a chlorination vessel and exposed to ultraviolet illumination. Chlorine was passed into the agitated mixture at a rate that allowed for maximum absorption of the chlorine. After 8 hours of chlorination, samples were taken every 2 to 3 hours, a total of 6 samples being removed. The carbon tetrachloride was removed from each sample by distillation under reduced pressure and a viscous yellow liquid remained in each case.

The 6 chlorinated dipentene materials, of different chlorine content, were tested for the insecticidal activity against house flies. In this and the following examples, the test for insecticidal activity against house flies was made in the following manner and is referred to in this specification as the bell jar method.

Approximately 100 five-day old flies (*Musca domestica*) were placed in a bell jar and a predetermined quantity of the insecticide to be tested was atomized into the bell jar. The quantity of insecticide used was equal to the amount of an Official Test Insecticide which was necessary to give a 30-55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analysis for chlorine content and of tests made on 5% solutions in Deo-Base of the above 6 polychloro p-menthanes are given in the following table. The data is an average of a series of tests made on each solution.

*Bell jar tests on flies*

| Chlorination Time in Hrs. | Per Cent Chlorine | Per Cent Dead in 24 Hrs. | O. T. I. Difference |
|---|---|---|---|
| 8 | 54.8 | 94 | +43 |
| 10 | 61.3 | 100 | +49 |
| 11.5 | 64.3 | 100 | +49 |
| 13.5 | 68.2 | 98 | +47 |
| 16.5 | 69.4 | 95 | +44 |
| 19.5 | 71.1 | 91 | +40 |

EXAMPLE 2

One part of p-menthane dissolved in 5 parts of carbon tetrachloride was placed in a chlorination vessel and exposed to ultraviolet illumination. Chlorine was passed into the agitated mixture at a rate that allowed for maximum absorption. After 11 hours of chlorination samples were taken every 2 to 4 hours, a total of 5 samples being taken. The carbon tetrachloride was removed from each sample by distillation under reduced pressure. The material which remained in each case was a viscous yellow liquid which was analyzed for chlorine content. The results of testing 5% solutions in Deo-Base of each of these polychloro p-menthanes for their insecticidal activity against house flies by the bell jar method are given in the following table.

*Bell jar tests on flies*

| Chlorination Time in Hrs. | Per Cent Chlorine | Per Cent Dead in 24 Hrs. | O. T. I. Difference |
|---|---|---|---|
| 11 | 57.0 | 95 | +40 |
| 14.5 | 63.5 | 100 | +45 |
| 18 | 67.5 | 100 | +45 |
| 20 | 70.45 | 87 | +32 |
| 24 | 71.6 | 69 | +14 |

EXAMPLE 3

A polychloro p-menthane containing 61.8% chlorine, prepared by chlorinating dipentene, was tested for its insecticidal activity in combination with isobornyl thiocyanoacetate. A Deo-Base solution containing 5% of this polychloro p-menthane and 2% of the isobornyl thiocyanoacetate when tested against house flies by the bell jar method was found to have a knockdown in 10 minutes of 100% and a 24-hour kill of 98% which corresponded to an O. T. I. difference of +53.

EXAMPLE 4

The test in Example 3 was repeated except that a polychloro p-menthane containing 68.2% chlorine was used in combination with the isobornyl thiocyanoacetate. This combination had a 10-minute knockdown of 100%, and a 24-hour kill of 98% which corresponded to an O. I. T. difference of +53.

Any polychloro monocyclic terpene containing from about 50% to about 75%, and preferably from about 55% to about 70% chlorine, may be used as the toxic ingredient of the insecticide compositions of this invention. Chlorinated monocyclic terpenes having a chlorine content of less than 50% are so inactive as to be worthless as insecticides. In fact, such compounds as a monochloro terpene lack any appreciable degree of insecticidal activity. The same thing is true for polychloro p-menthanes having a chlorine content above 75%, as the insecticidal activity decreases greatly as the chlorine content is raised above this point.

The polychloromonocyclic terpenes are prepared by chlorinating any monocyclic terpene, for example, polychloro p-menthanes are obtained by chlorinating dipentene, terpinolene, terpinene, p-menthene and p-menthane. The chlorination of the monocyclic terpene may be carried out in the presence or absence of a solvent. Lower temperatures are maintained during the chlorination if a solvent is used; however, in some instances it is preferable to use high temperatures in order to obtain the desired degree of chlorination. Suitable solvents for the chlorination are chloroform, carbon tetrachloride, pentachloroethane, etc. A chlorination catalyst may be used if desired, ultraviolet light being particularly effective.

The insecticidal compositions of this invention may be made up of the polychloro p-menthane admixed with any type of diluent. If a liquid spray is desired, the polychloro p-menthane may be dissolved in any convenient solvent, such as kerosene or Deo-Base, or it may be dispersed in water to form aqueous sprays. Insecticidal dusts may be prepared by placing the polychloro p-menthane on a diluent or carrier such as powdered carbon, kieselguhr, bentonite, pyrophyllite, etc.

For many purposes it may be desired to use the polychloro p-menthane in combination with other insecticidal toxicants. Many toxicants have a very high knockdown in relatively dilute solutions, but higher concentrations must be used in order to obtain the desired degree of kill. Due to the high degree of killing power which the polychloro p-menthanes possess, these compounds may be added to such toxicants, thereby enabling the use of much more dilute solutions than would otherwise be possible. Toxicants with which these polychloro p-menthanes may be combined include such compounds as rotenone, pyrethrum and organic thiocyanates such as alkyl thiocyanates, thiocyano ethers such as $\beta$-butoxy-$\beta'$-thiocyanoethyl ether, and terpene thiocyanoacylates such as isobornyl thiocyanoacetate, fenchyl thiocyanoacetate and isobornyl $\alpha$-thiocyanoproprionate.

As may be seen from the foregoing examples, the polychloro p-menthanes have a high degree of insecticidal activity. Thus the insecticidal compositions of this invention may contain any amount of the polychloro p-menthane that is effective against the pest being killed. For use as a household fly spray, 1% to 10% in Deo-Base may be used. However, for killing many types of pests it will be desirable to use much higher concentrations of these toxicants.

The insecticidal compositions of this invention are useful in combatting flies, mosquitoes, roaches, moths, and many other pests.

This application is a division of my copending application, Serial No. 609,019, filed August 4, 1945.

What I claim and desire to protect by Letters Patent is:

1. An insecticidal composition comprising a polychloro p-menthane containing from about 50% to about 75% of chlorine and a finely divided solid carrier.

2. An insecticidal composition comprising a polychloro p-menthane containing from about 55% to about 70% of chlorine and a finely divided solid carrier.

WILLIAM D. STONECIPHER.

REFERENCES CITED

The following references are of record in the file of this patent:

UNITED STATES PATENTS

| Number | Name | Date |
|---|---|---|
| 1,366,106 | Weeks | Jan. 18, 1921 |
| 2,010,841 | Bender | Aug. 13, 1935 |